United States Patent
Deferme et al.

(10) Patent No.: US 7,290,352 B2
(45) Date of Patent: Nov. 6, 2007

(54) MEASUREMENT DEVICE FOR A SUPPORT LAND FOR A VALVE DISC

(75) Inventors: Stefan Deferme, Heusdem-Zolder (BE); Patrick Bervoets, Borgloom (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 171 days.

(21) Appl. No.: 11/130,338

(22) Filed: May 16, 2005

(65) Prior Publication Data
US 2006/0254069 A1    Nov. 16, 2006

(51) Int. Cl.
*G01D 21/00*    (2006.01)
(52) U.S. Cl. .......................... 33/654; 33/600; 73/11.07
(58) Field of Classification Search ................ 33/654, 33/600; 73/11.04, 11.05, 11.06, 11.07, 11.08, 73/11.09
See application file for complete search history.

(56) References Cited

U.S. PATENT DOCUMENTS

| 3,720,091 | A  | * | 3/1973 | Kiefer ........................ 73/11.08 |
| 4,252,012 | A  | * | 2/1981 | Koepler et al. ............ 73/11.04 |
| 5,235,756 | A  | * | 8/1993 | Wickenhaver ............... 33/834 |
| 6,307,164 | B1 | * | 10/2001 | Campbell .................... 73/1.13 |
| 6,418,360 | B1 | * | 7/2002 | Spivey et al. .............. 73/11.04 |
| 6,886,670 | B2 | * | 5/2005 | Holiviers et al. ...... 188/322.15 |
| 6,899,207 | B2 | * | 5/2005 | Deferme et al. ......... 188/282.5 |

\* cited by examiner

*Primary Examiner*—Yaritza Guadalupe-McCall
(74) *Attorney, Agent, or Firm*—Harness, Dickey & Pierce, PLC (57) ABSTRACT

A measuring tool is designed to measure the relationship between an inner hub land and an outer land for a valve body. A locating face engages the inner hub land such that the measurements are taken with respect to the inner hub land. A probe is designed to engage the outer land. By rotating the valve body, the entire circumference of the outer land can be measured in relation to the inner hub land.

20 Claims, 7 Drawing Sheets

MEASUREMENT DEVICE FOR A SUPPORT LAND FOR A VALVE DISC

FIELD OF THE INVENTION

The present invention relates generally to shock absorbers and a measurement device for a support land for a valve disc. More particularly, the present invention relates to a measurement device for a support land for a valve disc which uses the hub support land as a reference surface and which measures the profile of the outer support land.

BACKGROUND OF THE INVENTION

Shock absorbers are used in conjunction with automotive suspension systems and other suspension systems to absorb unwanted vibrations which occur during movement of the suspension system. In order to absorb these unwanted vibrations, automotive shock absorbers are generally connected between the sprung (body) and the unsprung (suspension/chassis) masses of the vehicle.

The most common type of shock absorbers for automobiles is the dashpot type which can be either a mono-tube design or a dual-tube design. In the mono-tube design, a piston is located within a pressure tube and is connected to the spring mass of the vehicle through a piston rod. The pressure tube is connected to the unsprung mass of the vehicle. The piston divides the pressure tube into an upper working chamber and a lower working chamber. The piston includes compression valving which limits the flow of damping fluid from the lower working chamber during a compression stroke and rebound valving which limits the flow of damping fluid from the upper working chamber to the lower working chamber during a rebound or extension stroke. Because the compression valving and the rebound valving have the ability to limit the flow of damping fluid, the shock absorber is able to produce a damping force which counteracts the vibrations which would otherwise be transmitted from the unsprung mass to the sprung mass.

In a dual-tube shock absorber, a fluid reservoir is defined between the pressure tube and a reservoir tube which is positioned around the pressure tube. A base valve assembly is located between the lower working chamber and the fluid reservoir to control the flow of dampening fluid. The compression valving of the piston is moved to the base valve assembly and is replaced by a compression check valve assembly. In addition to the compression valving, the base valve assembly includes a rebound check valve assembly. The compression valving of the base valve assembly produces the damping force during a compression stroke, and the rebound valving of the piston produces the damping force during a rebound or extension stroke. Both the compression and rebound check valve assemblies permit fluid flow in one direction, but prohibit fluid flow in an opposite direction; however, they are designed such that they do not generate a damping force.

The valving for the shock absorber which determines the damping loads whether it is part of the piston assembly or the base valve assembly typically comprises one or more valve discs which is/are clamped or otherwise urged against a hub land by some type of a retainer. When the inner portion of the valve disc is clamped or urged against the hub land, the outer portion of the valve disc is biased against an outer land. The assembly of the valve discs against the lands defines flow restriction contours by means of the achieved interaction with the bending of the valve disc or the valve disc stack.

In order to control the flow restriction contours it is necessary to accurately control and measure the contour of the lands. Conventional or prior art measurement methods consist of a tool which has a reference surface which locates on the outer land and a dial type gauge with a flat probe which then measures the hub land. The measured values obtained by this prior art tool by locating the reference face of the measurement tool against the outer land provides an overall indication about the hub land in relation to the outer land but detailed information about the shape of the outer land is masked. Since the shape of the outer land is relevant to the control of the flow restriction contours, measurement of the outer land shape is needed.

SUMMARY OF THE INVENTION

The present invention provides the art with a measurement tool which measures the contour of the outer land in relation to the inner hub land. Since the valve discs of the valve assemblies are clamped or urged against the inner hub land and are then biased against the outer land, the present invention provides a measurement tool which has a reference face which is biased against the inner hub land. The true outer land shape is then measured preferably with a spherical probe across the entire circumference of the outer land. In order to avoid sampling errors, a measurement of the outer land is preferably taken every 5° around the circumference.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
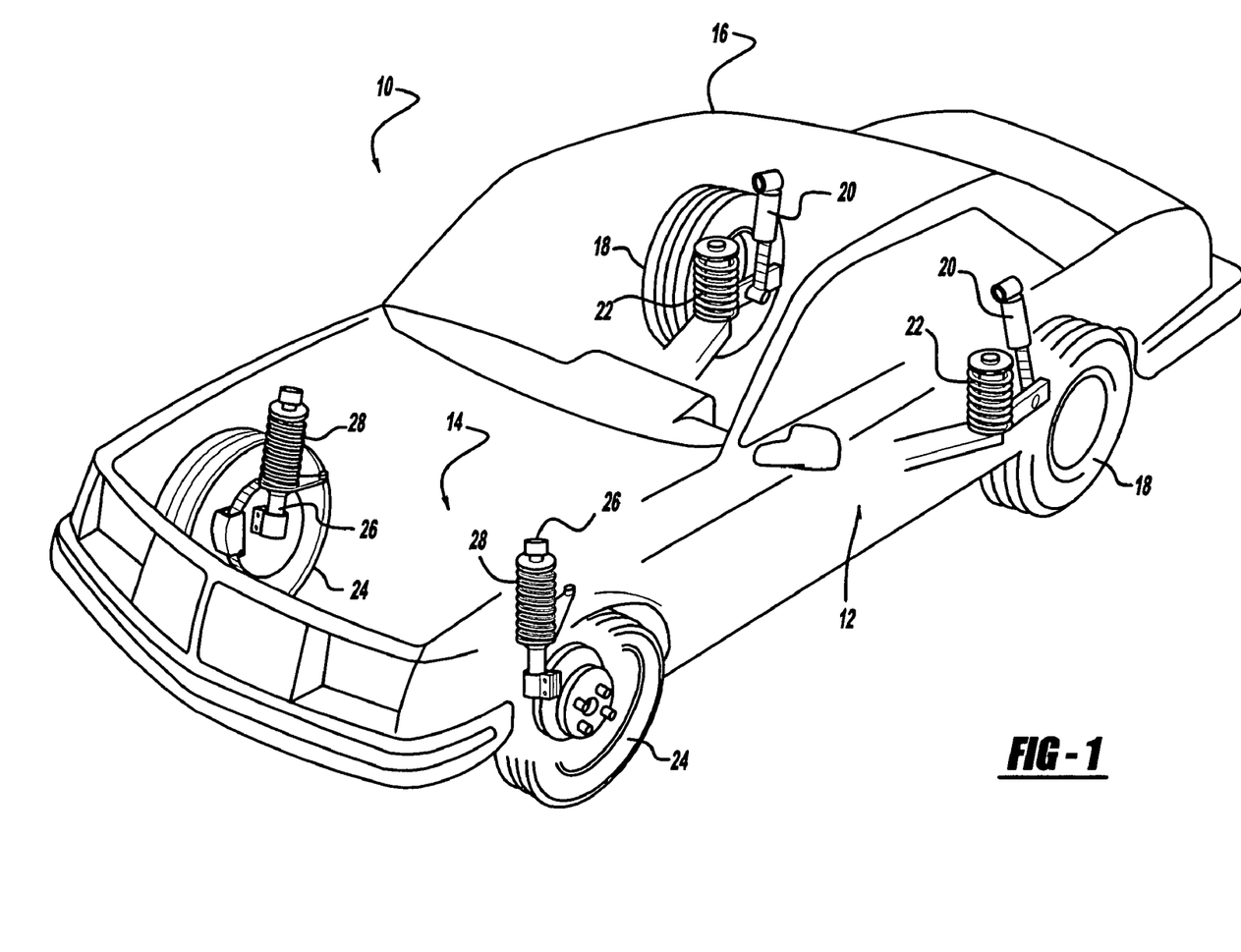
FIG. 1 is a schematic representation of a typical automobile which incorporates at least one shock absorber measured by a device in accordance with the present invention.

Referring now to the drawings in which like reference numerals designate like or corresponding parts throughout the several views, there is shown in FIG. 1 a vehicle which includes a suspension system incorporating the shock absorbers which have been inspected with the measurement tool in accordance with the present invention and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18 of vehicle 10. The rear axle assembly is operatively connected to body 16 by means of a pair of shock absorbers 20 and a pair of helical coil springs 22. Similarly, front suspension 14 includes a transversely extending front axle assembly (not shown) to operatively support a pair of front wheels 24 of vehicle 10. The front axle assembly is operatively connected to body 16 by means of a second pair of shock absorbers 26 and by a pair of helical coil springs 28. Shock absorbers 20 and 26 serve to dampen the relative motion of the unsprung mass (i.e., front and rear suspensions 12 and 14, respectively) and the sprung mass (i.e., body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
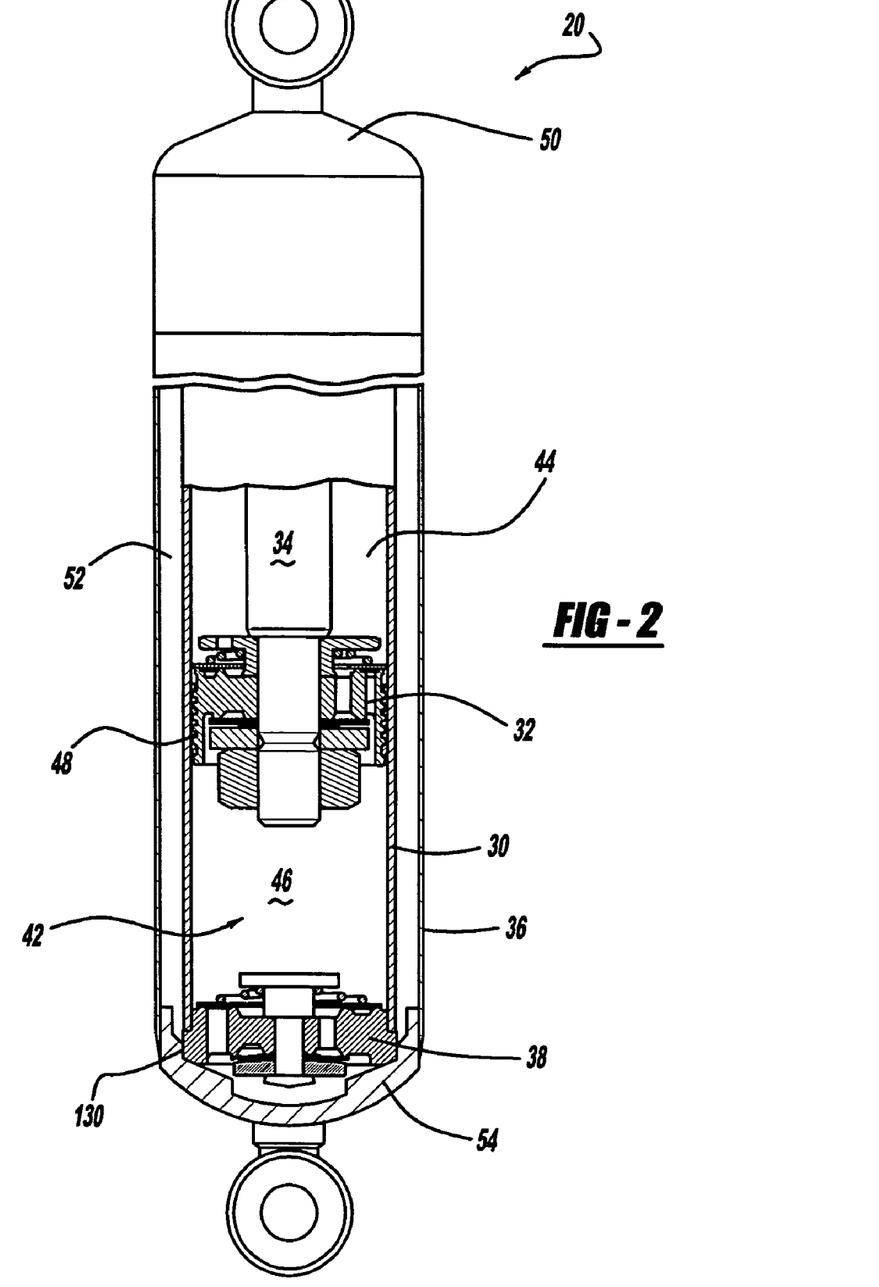
FIG. 2 is a side sectional view of the shock absorber in accordance with the present invention.

Referring now to FIG. 2, shock absorber 20 is shown in greater detail. While FIG. 2 illustrates only shock absorber 20, it is to be understood that shock absorber 26 also includes the valve assemblies described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod 34, a reservoir tube 36 and a base valve assembly 38.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through upper end cap 50 which closes the upper end of pressure tube 30. A sealing system seals the interface between upper end cap 50, reservoir tube 36 and piston rod 34. The end of piston rod 34 opposite to piston assembly 32 is adapted to be secured to the sprung portion of vehicle 10. Valving within piston assembly 32 controls the movement of fluid between upper working chamber 44 and lower working chamber 46 during movement of piston assembly 32 within pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 and the amount of fluid displaced in lower working chamber 46. The difference in the amount of fluid displaced is known as the "rod volume" and it flows through base valve assembly 38.

Reservoir tube 36 surrounds pressure tube 30 to define a fluid reservoir chamber 52 located between tubes 30 and 36. The bottom end of reservoir tube 36 is closed by an end cap 54 which is adapted to be connected to the unsprung portion of vehicle 10. The upper end of reservoir tube 36 is attached to upper end cap 50. Base valve assembly 38 is disposed between lower working chamber 46 and reservoir chamber 52 to control the flow of fluid between chambers 46 and 52. When shock absorber 20 extends in length, an additional volume of fluid is needed in lower working chamber 46 due to the "rod volume" concept. Thus, fluid will flow from reservoir chamber 52 to lower working chamber 46 through base valve assembly 38 as detailed below. When shock absorber 20 compresses in length, an excess of fluid must be removed from lower working chamber 46 due to the "rod volume" concept. Thus, fluid will flow from lower working chamber 46 to reservoir chamber 52 through base valve assembly 38 as detailed below.

Figure 3:
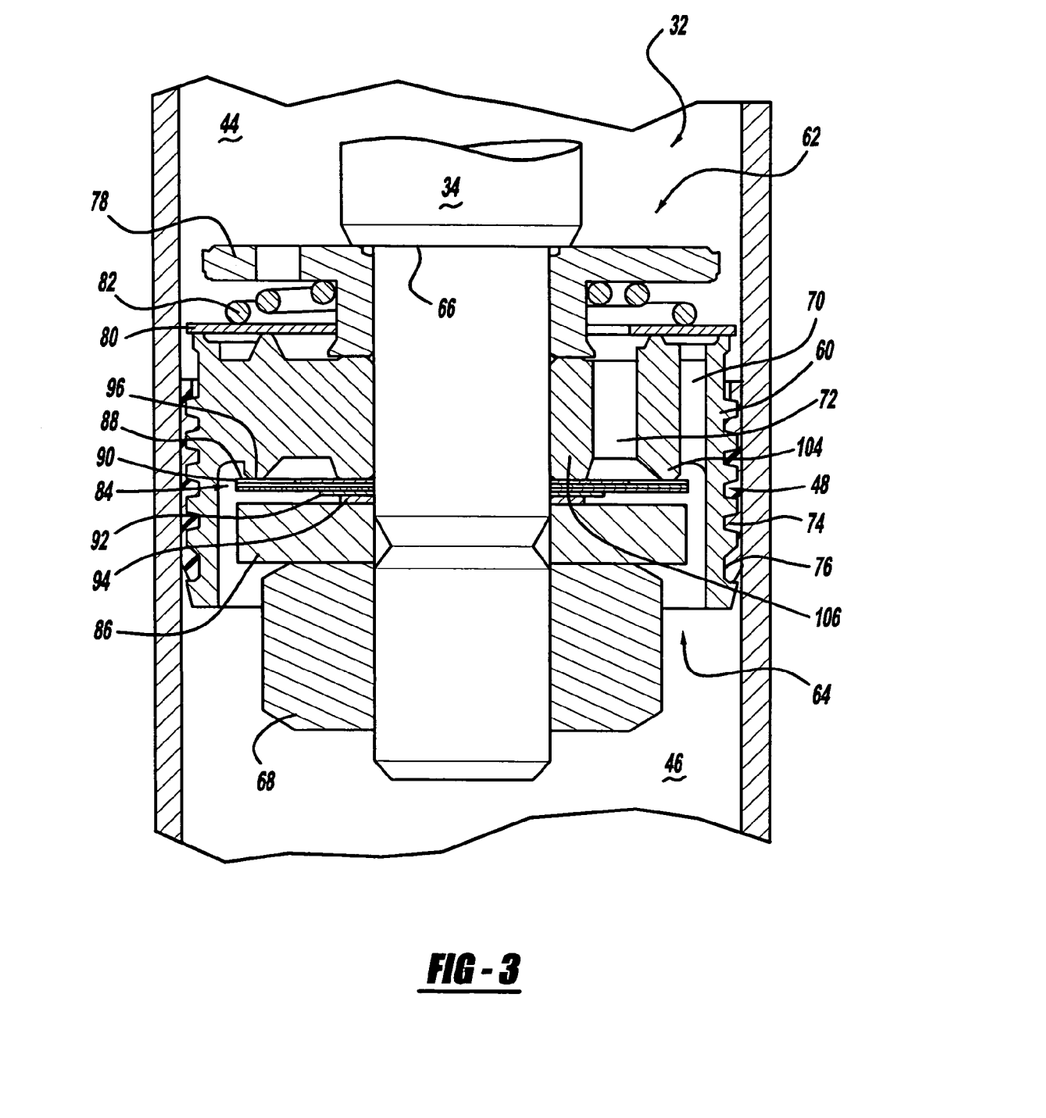
FIG. 3 is an enlarged cross-sectional view of the piston assembly in accordance with the present invention.

Referring now to FIG. 3, piston assembly 32 comprises a valve body 60, a compression check valve assembly 62 and a rebound valve assembly 64. Compression check valve assembly 62 is assembled against a shoulder 66 on piston rod 34. Valve body 60 is assembled against compression check valve assembly 62 and rebound valve assembly 64 is assembled against valve body 60. A nut 68 secures these components to piston rod 34.

Valve body 60 defines a plurality of compression passages 70 and a plurality of rebound passages 72. Seal 48 includes a plurality of ribs 74 which mate with a plurality of annular grooves 76 to permit sliding movement of piston assembly 32.

Compression check valve assembly 62 comprises a retainer 78, a valve disc 80 and a spring 82. Retainer 78 abuts shoulder 66 on one end and valve body 60 on the other end. Valve disc 80 abuts valve body 60 and closes compression passages 70 while leaving rebound passages 72 open. Spring 82 is disposed between retainer 78 and valve disc 80 to bias valve disc 80 against valve body 60. During a compression stroke, fluid in lower working chamber 46 is pressurized causing fluid pressure to react against valve disc 80. When the fluid pressure against valve disc 80 overcomes the biasing load of spring 82, valve disc 80 separates from valve body 60 to open compression passages 70 and allow fluid flow from lower working chamber to upper working chamber 44. Typically spring 82 only exerts a light load on valve disc 80, and it does not contribute to the damping characteristics for shock absorber 20. The damping characteristics for shock absorber 20 during a compression stroke are controlled by base valve assembly 38 which accommodates the flow of fluid from lower working chamber 46 to reservoir chamber 52 due to the "rod volume" concept as detailed below. During a rebound stroke, compression passages 70 are closed by valve disc 80.

Rebound valve assembly 64 comprises a plurality of valve discs 84 and a retainer 86. Retainer 86 is disposed between valve discs 84 and nut 68. Valve discs 84 are slidingly received on piston rod 34 and abut valve body 60 to close rebound passages 72 while leaving compression passages 70 open. Retainer 86 is also slidingly received on piston rod 34 and it abuts valve discs 84. Nut 68 clamps retainer 86 against valve discs 84 and valve discs 84 against valve body 60. The plurality of valve discs 84 comprise a bleed disc 88, a valve disc 90, a spacer disc 92 and a fulcrum disc 94. Bleed disc 88 includes at least one slot 96 which permits a limited amount of bleed flow bypassing rebound valve assembly 64. Fulcrum disc 94 provides a fulcrum or bending point for bleed disc 88, valve disc 90 and spacer disc 92. When fluid pressure is applied to discs 88 and 90, they will elastically deflect at the outer peripheral edge of spacer disc 92 and fulcrum disc 94 to open rebound valve assembly 64.

During a rebound stroke, fluid in upper working chamber 44 is pressurized causing fluid pressure to react against valve discs 84. When the fluid pressure reacting against valve discs 84 overcomes the bending load for valve discs 84, valve discs 84 elastically deflect opening rebound passages 72 allowing fluid flow from upper working chamber 44 to lower working chamber 46. The strength of valve discs 84 and the size of rebound passages 72 will determine the damping characteristics for shock absorber 20 in rebound. Prior to the deflection of valve discs 84, a controlled amount of fluid flows from upper working chamber 44 to lower working chamber 46 through slot 96 to provide low speed tunability.

Referring still to FIG. 3, rebound valve assembly 64 is designed to provide for the flow of fluid through rebound passages 72 from upper working chamber 44 to lower working chamber 46. Valve body 60 defines a first or outer land 104 and a second or inner hub land 106. Valve discs 84 are clamped between retainer 86 and inner hub land 106 of valve body 60 by nut 68. The clamping of valve discs 84 against inner hub land 106 also biases the outer portion of valve discs 84 against outer land 104. In order to control the fluid flow through fluid rebound passages 72, the relationship between outer land 104 in relation to inner hub land 106 must be accurately controlled. As detailed below, the present invention provides a measurement tool that is capable of accurately measuring the relationship of outer land 104 in relation to inner hub land 106.

Figure 4:
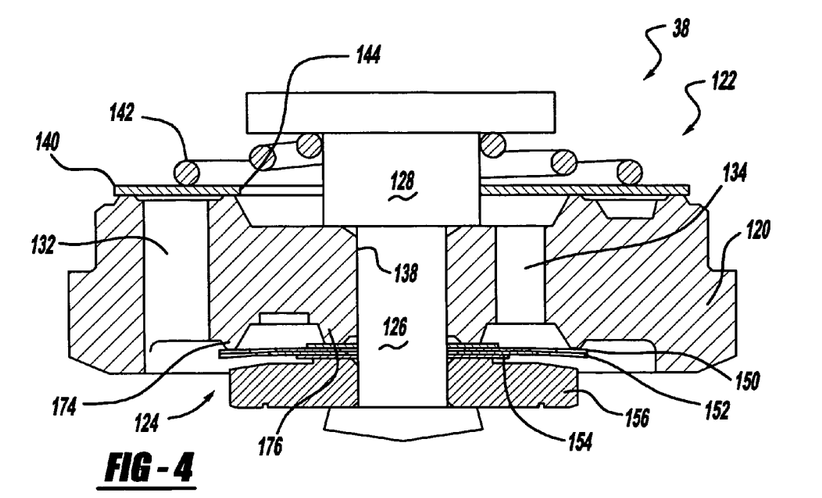
FIG. 4 is an enlarged cross-sectional view of the base valve assembly in accordance with the present invention.

Referring now to FIG. 4, base valve assembly 38 comprises a valve body 120, an intake or rebound check valve assembly 122, a compression valve assembly 124, a retaining bolt 126 and a retaining nut 128. Valve body 120 is secured to pressure tube 30 and end cap 54 by press fitting or by other methods known well in the art. End cap 54 is secured to reservoir tube 36 and it defines a plurality of fluid passages 130 which allow communication between reservoir chamber 52 and base valve assembly 38. Valve body 120 defines a plurality of intake or rebound fluid passages 132, a plurality of compression passages 134, and a central bore 138. Retaining bolt 126 extends through central bore 138 and threadingly engages retaining nut 128 to secure both intake valve assembly 122 and compression valve assembly 124 to valve body 120.

Rebound check valve assembly 122 comprises a valve disc 140 and a valve spring 142. Valve disc 140 is an annular member which defines an internal bore 144 for allowing fluid flow to reach compression passages 134 as described below. Valve disc 140 is biased against the upper surface of valve body 120 by valve spring 142 which is located between valve disc 140 and retaining nut 128. Valve disc 140 closes the plurality of rebound fluid passages 132. During a rebound stroke of shock absorber 20, fluid pressure decreases in lower working chamber 46 until the fluid pressure within reservoir chamber 52 and rebound fluid passages 132 is capable of overcoming the biasing force of valve spring 142. When the biasing force exerted by valve spring 142 is exceeded by fluid pressure acting against valve disc 140, valve disc 140 is moved away from valve body 120 to allow fluid flow from reservoir chamber 52 to lower working chamber 46.

Compression valve assembly 124 comprises one or more mid/high speed valve discs 150, one or more ported restriction discs 152 and one or more variable orifice bleed discs 154. Discs 150, 152 and 154 are stacked together and located adjacent to valve body 120 with mid/high speed valve disc 150 abutting valve body 120, ported restriction disc 152 abutting mid/high speed valve disc 150 and variable orifice bleed disc 154 abutting ported restriction disc 152. Discs 150, 152 and 154 are held in position by being sandwiched between a retainer 156 which is supported by retaining bolt 126 and the lower surface of valve body 120. Retaining bolt 126 is secured to valve body 120 by retaining nut 128.

During a compression stroke, fluid pressure increases in lower working chamber 46 causing a fluid pressure decrease in upper working chamber 44 causing a pressure imbalance between lower working chamber 46 and reservoir chamber 52. This pressure imbalance will cause fluid flow to begin through the low speed oil flow circuit defined by compression valve assembly 124. Fluid pressure first builds up in lower working chamber 46 until such a time that the fluid pressure in lower working chamber 46 acts against valve discs 150, 152 and 154 and overcomes the load necessary to deflect valve discs 150, 152 and 154 and allow fluid flow between lower working chamber 46 and reservoir chamber 52. Once the low speed oil flow circuit is saturated by the fluid flow rate, fluid pressure continues to build up in lower working chamber 46 until the pressure acting against the valve discs 150, 152 and 154 overcomes the load required to deflect discs 150, 152 and 154 further and allow additional fluid flow from lower working chamber 46 to reservoir chamber 52.

Referring still to FIG. 4, compression valve assembly 124 is designed to provide for the flow of fluid through compressor passages 134 from lower working chamber 46 to reservoir chamber 52. Valve body 120 defines a first or outer land 174 and a second or inner hub land 176. Discs 150, 152 and 154 are clamped between retainer 156 located on retaining bolt 126 and inner hub land 176 of valve body 120. The clamping of valve discs 150, 152 and 154 against inner hub land 176 also biases the outer portion of valve discs 150, 152 and 154 against outer land 174. In order to control the fluid flow through fluid compression passages 134, the relationship between outer land 174 in relation to inner hub land 176 needs to be accurately controlled. As detailed below, the present invention provides a measurement tool that is capable of accurately measuring the relationship of outer land 174 in relation to inner hub land 176.

Figure 5:
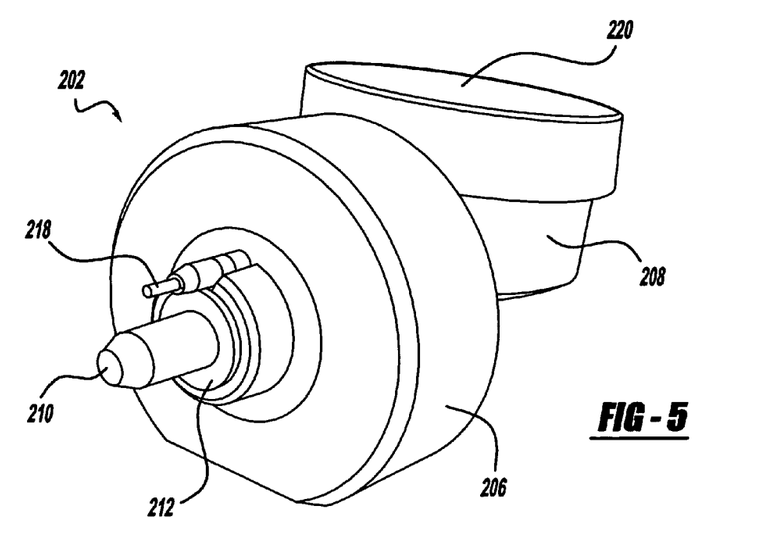
FIG. 5 is an end perspective view of the gauge head in accordance with the present invention.
Figure 6:
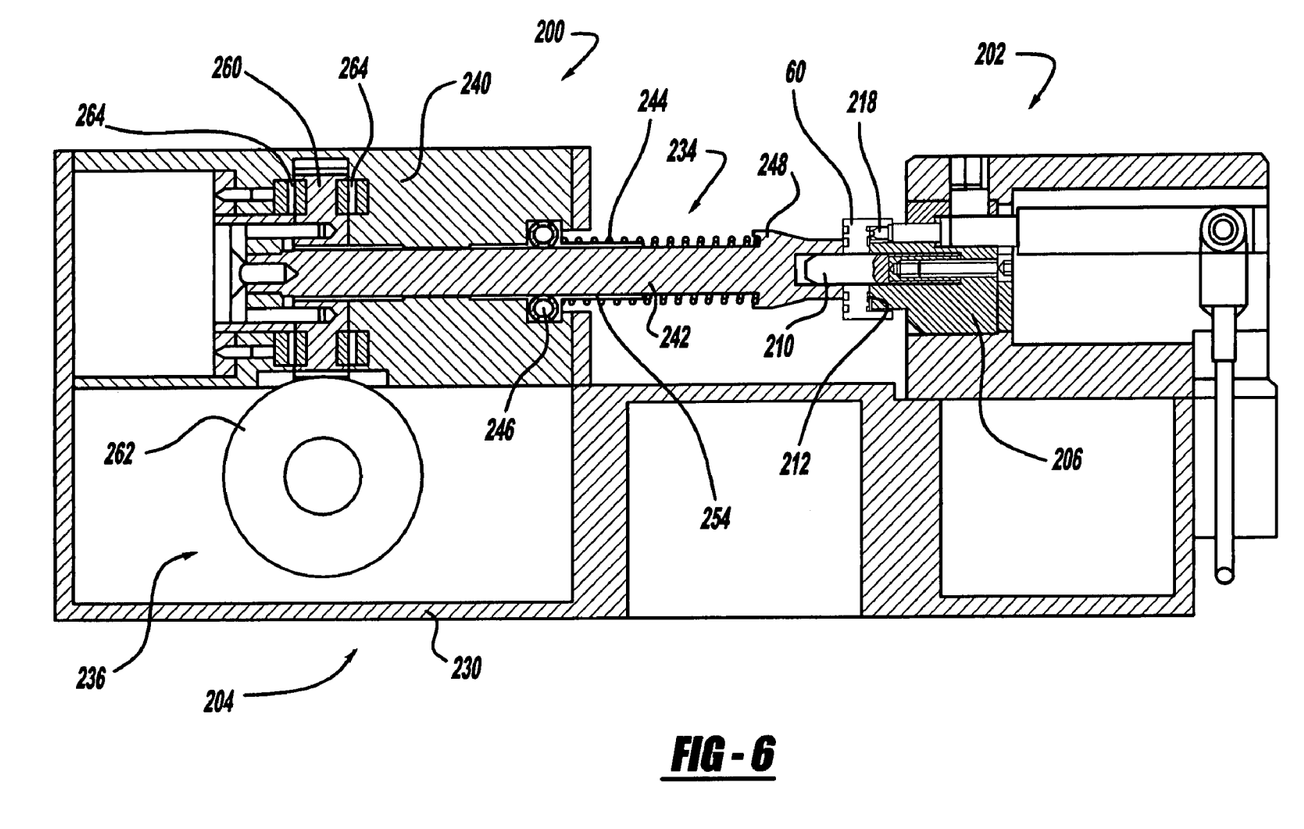
FIG. 6 is a side cross-sectional view of the measurement tool incorporating the gauge head illustrated in FIG. 5.
Figure 7:
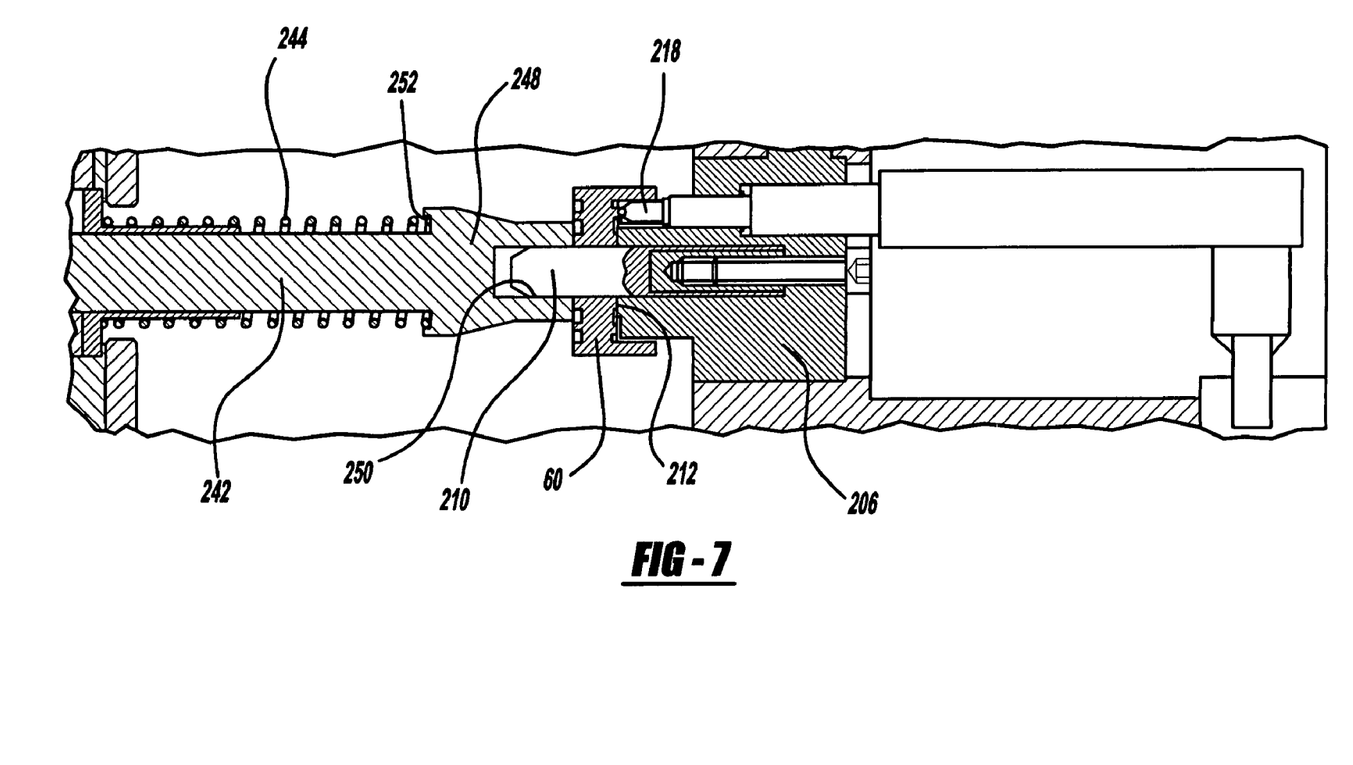
FIG. 7 is an enlarged partial side cross-sectional view of the measurement tool illustrated in FIG. 6.

Referring now to FIGS. 5-7, a measuring tool 200 is illustrated. Measuring tool 200 comprises a gauge head assembly 202 and a base assembly 204.

Gauge head assembly 202 comprises a locating head 206 and a measuring head 208. Locating head 206 is mounted to base assembly 204 and it defines a locating stud 210 and a location face 212. Valve body 60 or valve body 120 is positioned over locating stud 210 and against locating face 212. Locating face 212 is designed such that when valve body 60 or valve body 120 is located against locating face 212, inner hub land 106 of valve body 60 or inner hub land 176 of valve body 120 abuts locating face 212.

Measuring head 208 comprises a spherical probe 218 and a measuring device or dial gauge 220. While the present invention is being illustrated using spherical probe 218 and dial gauge 220, it is within the scope of the present invention to use any other measuring mechanism known in the art including but not limited to electronic, laser, or infra-red. Spherical probe 218 is mounted for movement with respect to dial gauge 220 and locating head 206 such that movement of spherical probe 218 causes synchronized movement of dial gauge 220 to indicate the precise amount of movement of spherical probe 218 with respect to locating head 206 as is well known in the art. Spherical probe 218 is positioned such that when valve body 60 or valve body 120 is located against locating face 212, spherical probe 218 engages outer land 104 of valve body 60 or outer land 174 of valve body 120. Thus, the position of outer land 104 or 174 is measured in relation to inner hub land 106 or 176, respectively, by gauge head assembly 202.

Base assembly 204 comprises a mounting base 230, a preloading device 234 and a rotating device 236. Mounting base 230 positions gauge head assembly 202 at one end of mounting base 230 and it positions both preloading device 234 and rotating device 236 at the opposite end of mounting base 230.

Preloading device 234 comprises a housing 240, a pressure piece 242 and a biasing spring 244. Housing 240 is mounted to base assembly 204. Pressure piece 242 extends through housing 240. Pressure piece 242 is mounted for rotation with respect to housing 240 by a bearing 246 or by other means known in the art. Pressure piece 242 includes a head 248 which is designed to engage valve body 60 or valve body 120 at a position on the opposite side of and which opposes inner hub land 106 or 176. A bore 250 extends into head 248. Bore 250 is designed to receive locating stud 210 to properly position head 248 with respect to gauge head assembly 202.

Biasing spring 244 is disposed between a spring seat 252 defined by pressure piece 242 and housing 240. A centering piece 254 is disposed between biasing spring 244 and bearing 246 to accommodate slight movements of biasing spring 244.

Valve body 60 or valve body 120 is positioned onto measuring tool 200 by first retracting pressure piece 242 by compressing biasing spring 244. Valve body 60 or valve body 120 is then positioned over locating stud 210 and pressure piece 242 is released such that inner hub land 106 or 176 is biased against locating face 212 and spherical probe 218 is in engagement with outer land 104 or 174. Pressure piece 242 and biasing spring 244 maintain the position of valve body 60 or valve body 120 during their movement.

Rotating device 236 comprises a ring gear 260 and a worm gear 262. While rotating device 236 is being illustrated as ring gear 260 and worm gear 262, it is within the scope of the present invention to utilize any method known in the art to rotate pressure piece 242 with respect to housing 240.

Ring gear 260 is secured to the end of pressure piece 242 by an axial spline or by other means known in the art such that ring gear 260 is locked to pressure piece 242 for rotation but pressure piece 242 is axially movable within ring gear 260. Ring gear 260 is mounted for rotation with respect to housing 240 by a pair of bearings 264. Worm gear 262 is also mounted for rotation within housing 240 at a position where worm gear 262 is in engagement with ring gear 260. Thus, rotation of worm gear 262 causes rotation of ring gear 260 which causes rotation of pressure piece 242 which causes rotation of valve body 60 or valve body 120 with respect to gauge head assembly 202. The rotation of valve body 60 or valve body 120 with respect to gauge head assembly 202 permits the measurement of the relative position of outer land 104 in relation to inner hub land 106 or the relative position of outer land 174 in relation to inner hub land 176 over the entire circumference of the lands.

The process for measuring or gauging outer land 104 in relation to inner hub land 106 or for measuring or gauging outer land 174 in relation to inner hub land 176 is to position valve body 60 or valve body 120 into measuring tool 200. This is accomplished by first retracting pressure piece 242 by compressing biasing spring 244. Valve body 60 or valve body 120 is then positioned over locating stud 210 and pressure piece 242 is released such that inner hub land 106 or 176 is biased against locating face 212 and spherical probe 218 is in engagement with outer land 104 or 174. Pressure piece 242 and biasing spring 244 maintain the position of valve body 60 or valve body 120 during the measurement process. At this point, dial gauge 220 will typically be zeroed or set at the average valve for the height of outer land 104 or 174. The base reference dimension will then be taken using dial gauge 220. Valve body 60 or valve body 120 will then be rotated preferably five degrees with respect to gauge head assembly 202 by the rotation of worm gear 262 which rotates ring gear 260 which rotates pressure piece 242 which rotates valve body 60 or valve body 120. Another measurement will then be taken using dial gauge 220. This process of rotating preferably five degrees and taking a measurement will continue through the entire three hundred and sixty degrees of outer land 104 or 174 until the entire circumference of the outer hub land has been measured. Thus, for a five degree interval between readings, seventy-two readings or measurements will be made for each outer land 104 or 174. While the process is described above using a five degree interval for measurements, it is within the scope of the present invention to use a different interval or to continuously take measurements throughout the circumference if desired.

Figure 8:
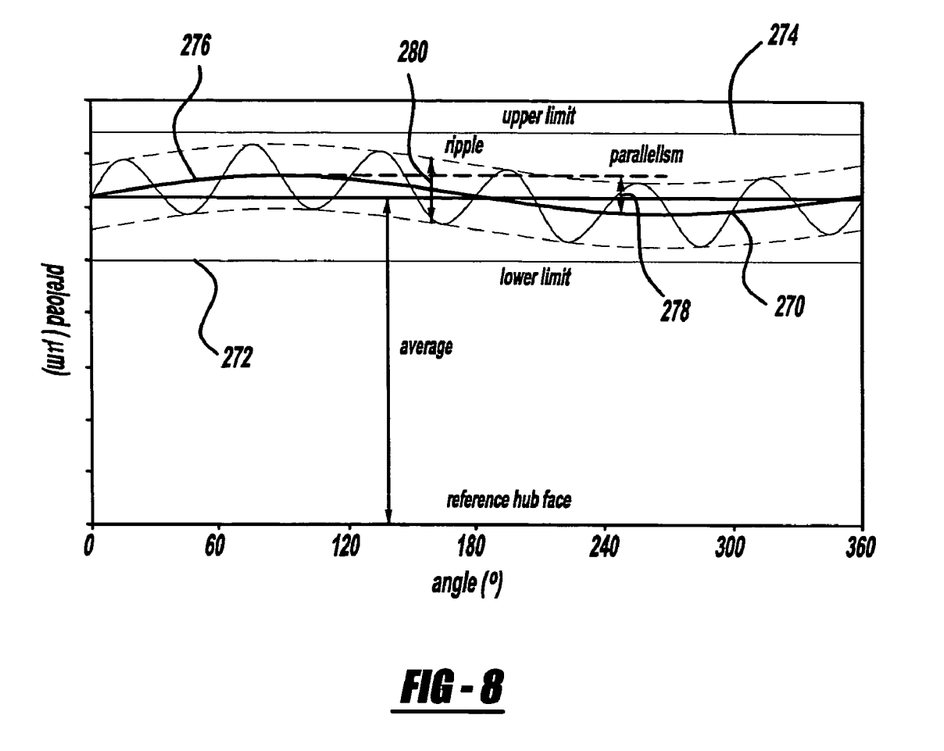
FIG. 8 is a typical result using the measurement tool in accordance with the present invention.

FIG. 8 illustrates a typical graph representing the seventy-two measurements made for the gauging or measurement of a single outer land 104 or a single outer land 174. As illustrated in FIG. 8, by data processing techniques and systems known well in the art, the true shape 270 of outer land 104 or outer land 174 can be plotted in relation to the lower processing limit 272 and the upper processing limit 274 for the outer land. Using the seventy-two data points, an average value 276 for the height differences between inner hub land 106 or 176 and outer land 104 or 174, respectively can be calculated and plotted. In addition, a value for the parallelism 278 (deviation) from the outer land 104 or 174 against the inner hub land 106 or 176, respectively can also be illustrated. Also, a value for the ripple 280 (flatness) of outer land 104 or 174 can be illustrated.

The present invention provides a measuring or gauging tool 200 and process for accurately measuring outer land 104 or 174 in relation to inner hub land 106 or 176. By accurately measuring and thus controlling these features of the valve assemblies, accurate control of the fluid flow and thus the damping characteristics of shock absorber 20 can be maintained.

As discussed above, the measurement system used can be any of the various measurement systems known in the art and this is to include non-touching measurement techniques as well as continuous measurement techniques. In addition, the rotation and subsequent taking of the seventy-two measurements can be automated as is well known in the art. Finally, the present invention is not limited to seventy-two measurements, as any appropriate number of measurements or continuous measurement around the circumference of the outer land can be used.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A measuring tool for a valve body having an inner land and an outer land disposed radially outward from the inner land, the measuring tool comprising:

a locating head assembly defining a locating face for engagement with the inner land;

a probe disposed radially outward from the locating face, the probe being movably mounted to the locating head assembly for engagement with the other land; and a measuring device associated with the probe for indicating the relative position of the outer land with respect to the inner land.

2. The measuring tool according to claim 1, wherein the measuring device is a dial gauge.

3. The measuring tool according to claim 1, further comprising a preloading device adapted to urge the inner land of the valve body into engagement with the locating face of the locating head.

4. The measuring tool according to claim 3, wherein the preloading device comprises a pressure piece and a biasing spring.

5. The measuring tool according to claim 4, wherein the pressure piece includes means for: engaging the valve body.

6. The measuring tool according to claim 3, further comprising a rotating device adapted to rotate the valve body with respect to the measuring device.

7. The measuring tool according to claim 6, wherein the preloading device comprises a pressure piece and a biasing spring.

8. The measuring tool according to claim 7 wherein the rotating device rotates the pressure piece.

9. The measuring tool according to claim 7, wherein the pressure piece includes a head adapted for engagement with the valve body.

10. The measuring tool according to claim 9, wherein the rotating device rotates the head.

11. The measuring tool according to claim 1, wherein the locating face is an annular locating face and the measuring tool further comprises a locating stud disposed within the annular locating face.

12. A measuring tool for a valve body having an inner land and an outer land disposed radially outward from the inner land, the measuring tool comprising:

a locating head assembly defining a locating face for engagement with the inner land;

a probe movably mounted with respect to the locating face for engagement with the other land;

a measuring device associated with the probe for indicating the relative position of the outer land with respect to the inner land; and a rotating device adapted to rotate the valve body with respect to the measuring device.

13. A method of measuring the relationship between an inner land and an outer hub land disposed radially outward from the inner land of a valve body, the method comprising:

positioning the inner land of the body against a locating surface; measuring a plurality of positions of the outer land in relation to the locating surface while the inner land of the body remains positioned against the locating surface.

14. The method of measuring according to claim 13 further comprising biasing the inner land into engagement with the locating surface.

15. The method of measuring according to claim 14 further comprising rotating the valve body with respect to the locating surface.

16. The method of measuring according to claim 15 further comprising measuring the plurality of positions during the rotation of the valve body.

17. The method of measuring according to claim 13 further comprising positioning a probe radially outward from the locating surface and in contact with the outer land.

18. A method of measuring the relationship between an inner land and an outer hub land disposed radially outward from the inner land of a valve body, the method comprising:

positioning the inner land of the body against a locating surface;

measuring the position of the outer land in relation to the locating surface; and rotating the valve body with respect to the locating surface.

19. The method of measuring according to claim 18 further comprising taking a plurality of measurements during the rotation of the valve body.

20. The method of measuring according to claim 18 further comprising positioning a probe in contact with the outer land.

* * * * *